United States Patent [19]
Walter et al.

[11] 3,936,057
[45] Feb. 3, 1976

[54] SHAFT SEALS

[75] Inventors: Gerhard W. H. Walter; Günter W. E. Pietsch, both of Hamburg, Germany

[73] Assignee: Howaldtswerke - Deutsche Werft Aktiengesellschaft Hamburg und Kiel, Germany

[22] Filed: Aug. 10, 1973

[21] Appl. No.: 387,243

[30] Foreign Application Priority Data
Aug. 11, 1972 Germany............................ 2239570

[52] U.S. Cl. ........................ 277/59; 277/15; 277/68
[51] Int. Cl.² .......................................... F16J 15/16
[58] Field of Search .............. 277/68, 69, 15, 22, 59

[56] References Cited
UNITED STATES PATENTS

| | | | |
|---|---|---|---|
| 2,226,001 | 12/1940 | La Bour | 277/15 |
| 2,249,188 | 7/1941 | Stevenson | 277/68 X |
| 2,864,258 | 12/1958 | Klingler | 277/68 X |
| 3,625,523 | 12/1971 | Gardner | 277/59 |
| 3,726,531 | 4/1973 | Pagan | 277/59 |

Primary Examiner—Samuel B. Rothberg
Attorney, Agent, or Firm—Stevens, Davis, Miller & Mosher

[57] ABSTRACT

A shaft seal of the kind in which at least two sealing rings are spaced apart axially from one another on a rotatable shaft or on a bush fastened to the shaft is provided between the sealing rings with one or more deflectors which are spaced from the sealing rings and are engageable with the shaft or bush and act to deflect and whirl liquid lubricant circulating between the sealing rings so as to improve circulation of the lubricant and lengthen the life of the seals.

21 Claims, 12 Drawing Figures

SHAFT SEALS

BACKGROUND OF THE INVENTION

1. Field of the Invention

This invention relates to improvements in shaft seals of the kind in which at least two sealing rings spaced apart axially from one another act either on a rotating shaft or on a bush fastened to the shaft, the sealing rings preferably being in the form of lip type sealing rings.

2. Description of the Prior Art

For the purpose of cooling lubricants for shaft seals various kinds of devices are known in which an outlet and an inlet for liquid lubricant, for example oil, are provided in radially opposite positions, the outlet and inlet both being connected to a pressure vessel. Through the rotation of the shaft, or of the bush fastened to the shaft, lubricant is forced into the outlet pipe, cooled in the vessel by suitable cooling devices, and the cooled oil is returned into the inlet pipe of the seal.

In a modified arrangement it is also possible, particularly in the case of the so-called stern tube seals for sealing ship's shafts, to provide a special oil pump, which however is relatively expensive. In one known construction of seals of this kind the oil chamber is therefore disposed eccentrically in relation to the shaft, and through the resulting wedge action the oil is guided to a pressure vessel and away from the latter again, the inlet and outlet for the oil being disposed at an angle of about 30° in relation to the shaft axis.

This construction however is comparatively sensitive, and disturbances may occur in the event of the displacement of the shaft. In practice it has been found that, despite such devices, by which a circulation of liquid lubricant is maintained, residues of lubricant are deposited on the sealing rings, so that precisely at these points, which are most exposed to friction, there is an undesirable rise in temperature and therefore premature wear of the sealing rings.

The problem underlying the invention consists in ensuring at low cost, in the case of shaft seals which have at least two sealing rings which are spaced apart axially and between which a quantity of liquid lubricant is disposed, that improved circulation of the lubricant in the chamber of the seal is achieved, particularly in the region of the sealing rings, which are preferably in the form of lip type sealing rings, together with accelerated removal of residues of lubricant and particles of dirt.

SUMMARY

According to the invention there is provided a device for improving circulation of liquid lubricant in a chamber formed between two axially spaced sealing rings mounted on a shaft or on a bush joined to the shaft, said device comprising a deflector element and a support therefor arranged to support the deflector element between the sealing rings in spaced relation therewith and with an inner end of the deflector element resting on the shaft or bush. The deflector element may cooperate with a cooling device and for this purpose at least one inlet and one outlet for the lubricant, which are in communication with a cooling device, may be disposed in the proximity of the deflector element. In another embodiment of the invention, however, it is also possible to dispense with the cooling device.

In a preferred embodiment of the invention the deflector element is formed as a kind of planar element between two sealing rings of the seal, which planar element may either extend along a radius of the shaft or may be disposed at an angle to a radius of the shaft. Instead of a deflector element in the form of a planar element resting obliquely on the shaft or bush, it is also possible to provide two planar elements disposed oppositely to one another.

The deflector element may be composed of a single or of a composite planar part.

According to another embodiment of the invention it is possible to provide in the body of the deflector element one or more channels for the passage of liquid lubricant, and these channels may be in the form of slots which are provided on the bottom edge, resting on the shaft or bush, of the planar element.

In another embodiment of the invention the deflector element may be adjustable in the radial direction in relation to the shaft, while it is also possible for the deflector element to be pushed resiliently by spring force, which may be adjustable, on to the periphery of the shaft or bush.

In another embodiment of the invention the deflector element or its support may be provided with a pipe which is in direct communication with a lubricant cooling device.

For practical reasons it is preferred to provide, on both sides of the deflector element only a single inlet pipe and outlet pipe leading to and from a cooling device, but a plurality of such inlet pipes and outlet pipes distributed over the periphery between two sealing rings, and united to form a common inlet pipe and outlet pipe, may be provided.

It is preferable for inlet and outlet pipes associated with the deflector element to extend in the radial direction in relation to the axis of the shaft; this however is not essential for the performance of the invention.

In another embodiment of the invention it is possible for the inlet and outlet pipes to extend in each case at an angle to a radius of the shaft, while it is also possible for the inlet and outlet pipes to extend tangentially to the shaft or bush.

Depending on requirements, a plurality of deflector elements with their associated parts may be distributed around the periphery of the shaft or bush.

DESCRIPTION OF THE PREFERRED EMBODIMENTS

Figure 1:
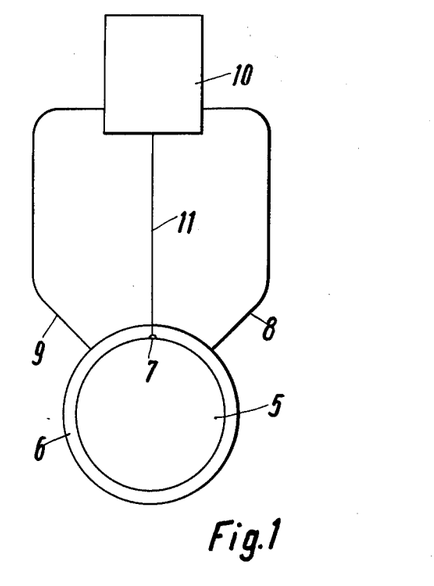
FIG. 1 is a diagrammatic elevation of the device according to the invention, in conjunction with a cooling device.

Referring to the drawings, a shaft 5, FIG. 1, is surrounded by a lubricant chamber 6.

A deflector element 7 rests on a shaft or bush 5 comprising a rotatable member and is associated with an inlet pipe 8 and an outlet pipe 9, each of which is in communication with a cooling device 10. FIG. 1 shows that the deflector element 7 may be connected by a direct pipe 11 to the cooling device 10, in order to discharge air collecting in the space between two sealing rings.

Figure 2:
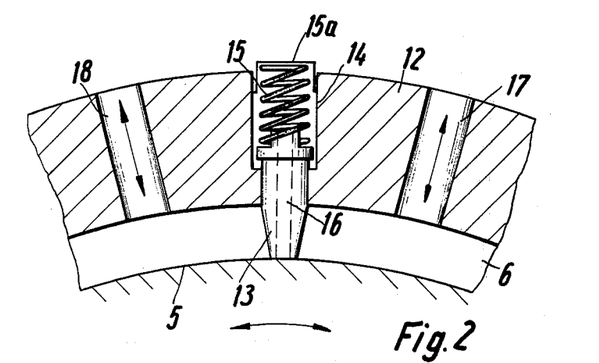
FIG. 2 is a partial section, to an enlarged scale, through one embodiment of a deflector element which has an inlet pipe and an outlet pipe for the lubricant.

In the embodiment illustrated in FIG. 2, there is disposed in a sealing ring carrier 12 a deflector element 13 which is a planar element slightly tapered at its bottom, or inner, end and the inner end face of which rests on the periphery of the shaft or bush 5. The carrier 12 is also provided with a chamber 14 containing a spring 15 the force of which can be adjusted by means of a threaded cap 15a and which rests on the deflector element 13. The deflector element 13 is provided with a bore 16 which is in communication with the pipe 11, FIG. 1, leading to the cooling device 10 and may be connected to a transverse bore (not shown).

The carrier 12 is provided with bores 17 and 18 disposed, considered in the direction of rotation, respectively in front of and behind the deflector element 13. Depending on the direction of rotation of the shaft 5, either the bore 17 or the bore 18, which are respectively connected by pipes 8 and 9 to the cooling device 10, serves as an inlet or an outlet aperture for the lubricant.

Figure 3:
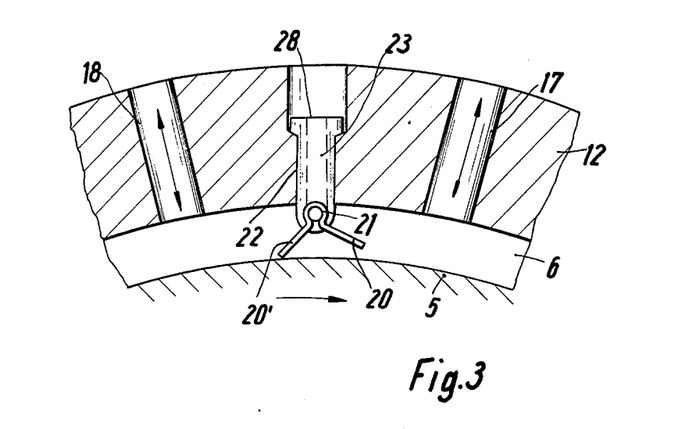
FIG. 3 is a partial section, to an enlarged scale, through another embodiment of a deflector element which has an inlet pipe and an outlet pipe for the lubricant.

In the embodiment shown in FIG. 3 the deflector element is a planar element 20 which extends obliquely to a radius of the shaft 5 and which is mounted in the carrier 12 by means of a pivot 21 carried by a support 22. As indicated, depending on the direction of rotation of the shaft 5, the planar element 20 may be disposed in the position directed towards the right or in the position directed towards the left, as indicated at 20'. The planar element 20 is so constructed that on reversal of the direction of rotation of the shaft 5 the planar element 20 can swing into a position as indicated at 20' for clockwise rotation of the shaft 5. The support 22 for the deflector element 20 may be provided with a bore 23 for discharging air or the like.

Figure 4:
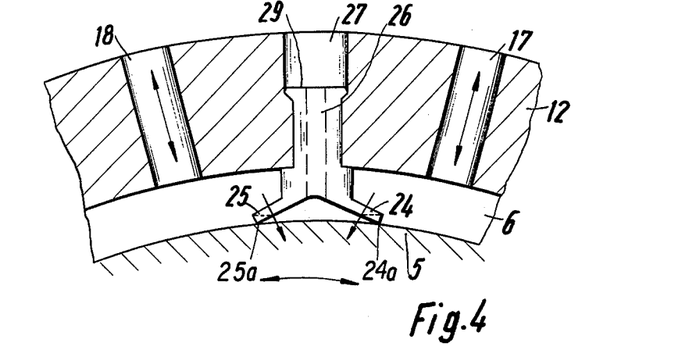
FIG. 4 is a partial section, to an enlarged scale, through an embodiment of a deflector element which is modified in relation to FIG. 3 and which has an inlet pipe and an outlet pipe for the lubricant, FIG. 5 diagrammatically shows a top plan view of a deflector element in which the deflector element, seen from above, has the shape of a hexagon.

FIG. 4 shows an embodiment which is modified in relation to FIG. 3 in that the deflector element has resilient arms 24, 25 having the form of an inverted V, each of the arms of which extends at an angle to a radius of the shaft 5. The resilient arms 24, 25 are carried by a holder 26, which is disposed in a recess 27 in the carrier 12. With this arrangement swinging or tipping of the deflector element is not necessary because, depending on the direction of rotation of the shaft 5, either the arm 24 or the arm 25 rests as a deflector element on the periphery of the shaft or bush 5.

It is advantageous for the deflector elements according to the invention to be made of a resilient material. As can be seen particularly in FIGS. 3 and 4, for the purpose of supporting the deflector elements it is possible to provide enlarged portions 28 and 29 respectively which locate the deflector element in position in the carrier 12. In the embodiments illustrated in FIGS. 3 and 4 it is also possible, if necessary, to provide springs, not shown, for pressing the deflector element agains the periphery of the shaft or bush 5.

In the deflector element, for example as shown in FIG. 4, it is possible to provide channels 24a, 25a formed by one or more apertures, grooves, slots, or the like, for part of the flow of lubricant, and the channels may be provided on the end of the deflector element which rests on the shaft 5.

Figure 5:
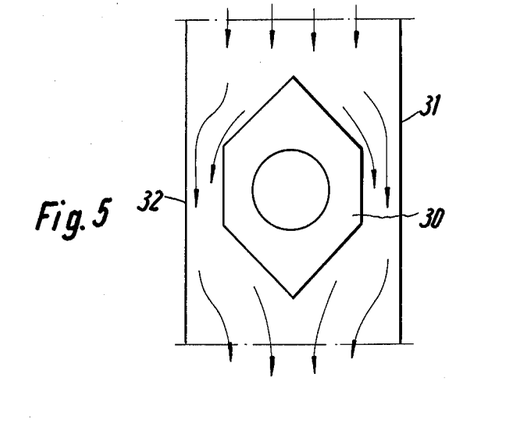

In the embodiment of the invention illustrated in FIG. 5 a deflector element 30, which is disposed between and spaced apart from two diagrammatically indicated sealing rings 31 and 32, has the general cross-sectional shape of a hexagon, the side walls being disposed at a distance from the sealing rings 31 and 32. In this figure the path of the circulation of the liquid lubricant is indicated by arrows.

Figure 6:
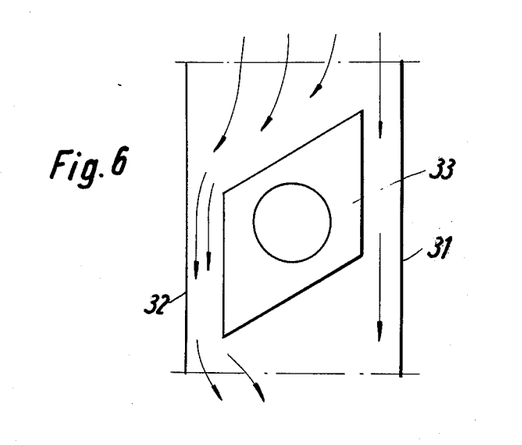
FIG. 6 shows another example of a deflector element in which the deflector element, seen from above, has the shape of a parallelogram.

In the embodiment shown in FIG. 6 a deflector element 33 has the general cross-sectional shape of a parallelogram, and this figure also shows approximately the flow of the lubricant.

Figure 7:
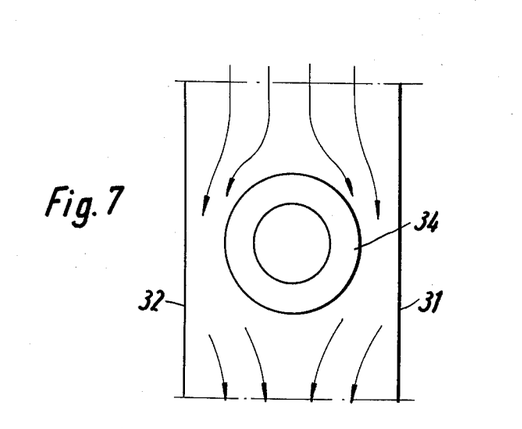
FIG. 7 shows a modified example of a deflector element in which the deflector element is circular in cross-section.

In the embodiment illustrated in FIG. 7, a deflector element 34 has a generally circular cross-section. Here again the flow conditions are indicated.

Figure 8:
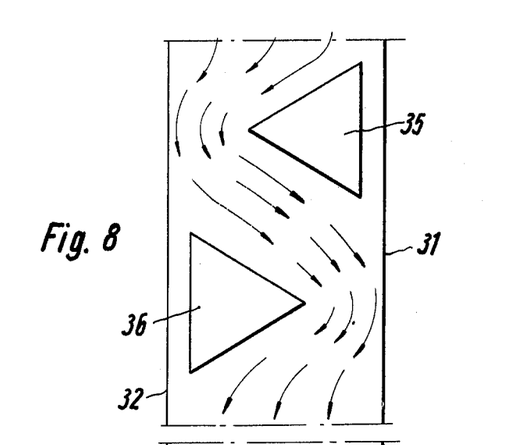
FIG. 8 shows another example of the invention in which two cooperating deflector elements are provided in which, seen from above, each are of triangular shape and are disposed at a distance from each other.

In the embodiment illustrated in FIG. 8 two deflector elements 35 and 36 are provided which have an approximately triangular cross-sectional shape, the flow conditions being indicated approximately in this figure. One side of each of the deflector elements 35 and 36 is disposed at a distance from the diagrammatically indicated sealing rings 31 and 32.

Figure 9:
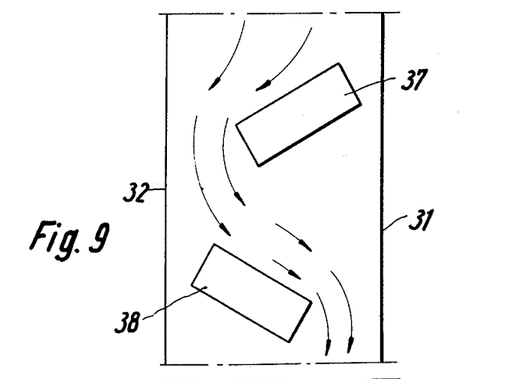
FIG. 9 shows another modified example in which the deflector element consists of two parts of rectangular cross-section disposed at a distance from one another with their longitudinal axes extending at an angle to one another.

In the embodiment shown in FIG. 9 two deflector elements 37 and 38 have in each case the general cross-sectional shape of a rectangle, these rectangles being disposed at an angle to one another and at an angle to the axis of the lubricant chamber. The flow conditions are indicated diagrammatically.

Figure 10:
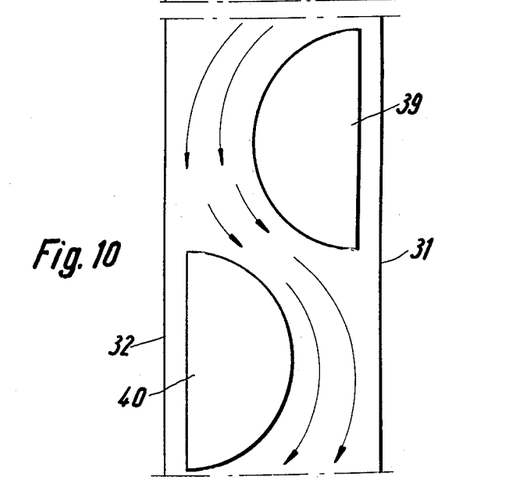
FIG. 10 shows another modified example of a deflector element consisting of two parts in which each seen from above are of semicircular shape and are disposed at a distance from one another.

In the embodiment illustrated in FIG. 10 two deflector elements 39 and 40 have in each case the cross-sectional shape of a semicircle; a different curved shape may however also be selected. In these embodiments the lubricant driven by the rotation of the shaft 5 is partly dammed and partly deflected, whereby the intended accelerated removal of lubricant residues and particles of dirt is achieved. The deflector elements may taper conically upwards in their cross-section.

The deflector elements shown in FIGS. 5 to 10 may be supported by their supports in the carrier of the sealing rings in the manner shown in FIGS. 2 to 4.

Figure 11:
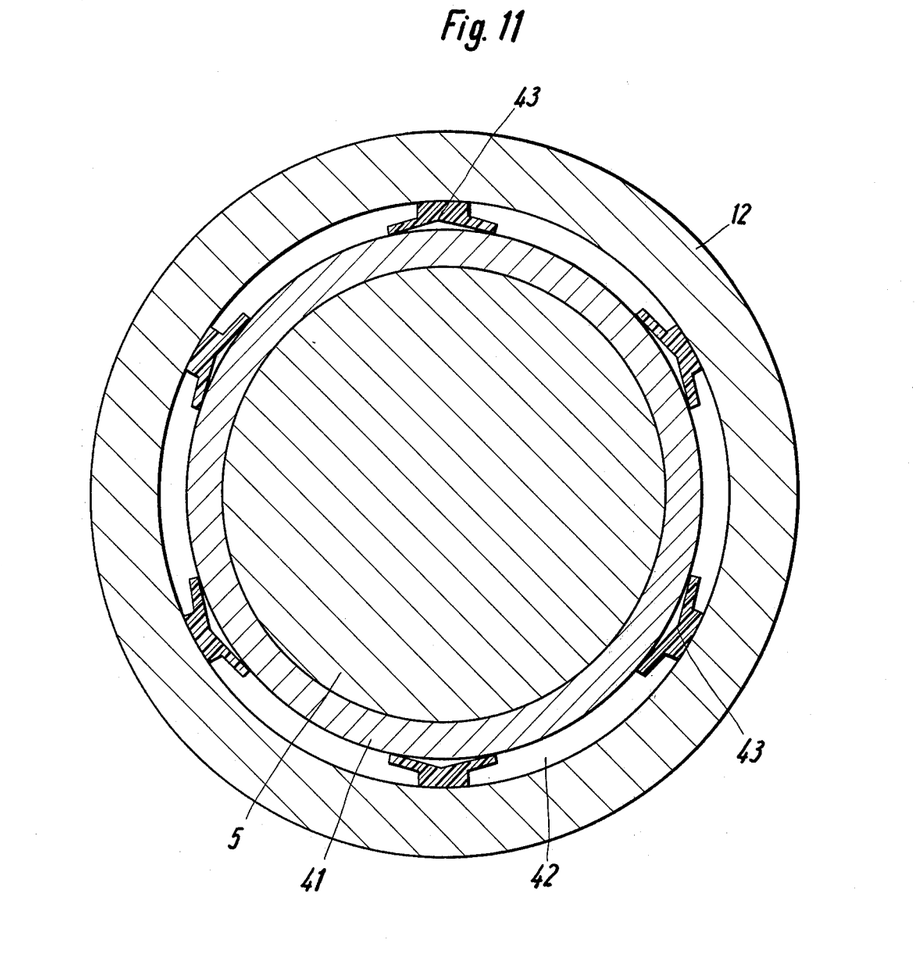
FIG. 11 is a diagrammatic cross-section through a shaft seal having a plurality of deflector elements distributed around the periphery of a shaft or bush.

In the embodiment illustrated in FIG. 11 a bush 41 is mounted on the shaft 5, and between the bush 41 and the carrier 12 for the sealing rings an annular lubricant chamber 42 is provided. As can be seen from the figure, a plurality of deflector elements 43 are distributed around the periphery of the bush 41, and these deflector elements may be constructed in accordance with any of the embodiments shown in FIGS. 2 to 10. Inlet and outlet pipes for the lubricant, leading to a cooling device, may be associated with the deflector elements or with some of the deflector elements, as can be seen from the diagrammatic illustration in FIG. 1.

Figure 12:
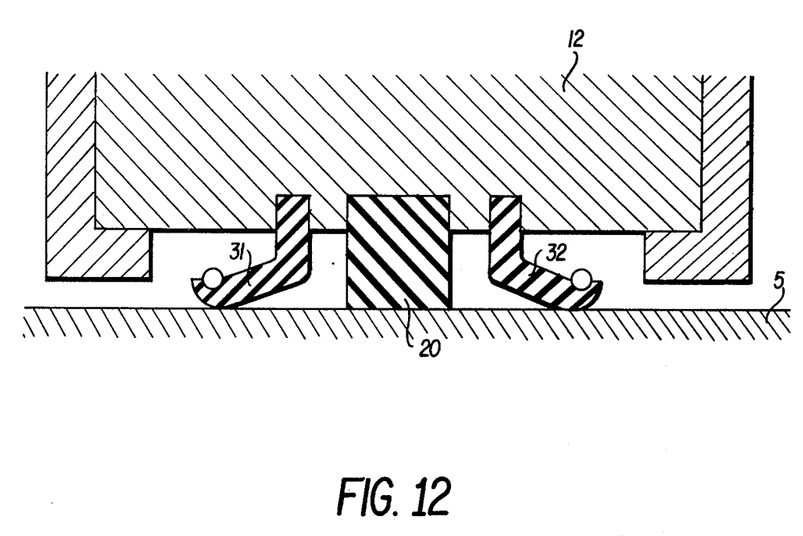
FIG. 12 is a cross-section of a shaft seal showing the device of the present invention.

FIG. 12 illustrates in cross-section, and in one view, two sealing rings 31, 32, mounted on a rotatable member of shaft 5, a stationary deflector element such as element 20 having one end resting on the periphery of shaft 5, and a means or carrier 12 surrounding the shaft 5, and supporting the deflector element 20 between the sealing rings 31, 32.

The width of the deflector element or elements in a shaft seal is conveniently so selected that their end faces extend to a point near the sealing rings or, in the case of lip type sealing rings, to a point close to the lips of the sealing rings.

When the shaft 5 rotates in one direction or the other, it or the bush 41 carries with it a determined amount of liquid lubricant (oil), which is deflected by striking against the deflector element or elements and is caused to perform a whirling movement, so that part of the lubricant may be guided through the bores 17 to 18 and the pipes 8 or 9 to the cooling device 10 and thence can flow back through the return pipe 9 or 8 into the lubricant chamber 6 between two sealing rings.

The lengthening of the life of the seal or of the sealing rings is dependent, among other factors, on adequate lubrication of the sealing lips. Oil residues and foreign bodies deposited under the sealing lips impair the functioning of the seals. Increased wear of the sealing rings and of the chrome-steel bush or shaft are the consequence. Oil residues are the consequence of higher operating temperatures. Particles of dirt are the cause of a further rise in temperature.

It is therefore important that the lubricant should be continuously replaced in the region of the sealing rings, so that the residues and particles of dirt accumulating under the sealing lips can be removed. This problem is solved by the invention. By deflecting and whirling the flow of lubricant rotating with the shaft or bush continuous replacement inside the seal between the two sealing rings is ensured. This operation takes place within a self-enclosed annular chamber.

Through the arrangement of the deflector element, particularly in the parts which lie near a sealing ring, a certain acceleration is brought about in the liquid lubricant driven by the shaft or bush, so that precisely in these parts the lubricant, for example oil, is removed more quickly and thus in these positions a particularly effective cleaning action is achieved. This results in excellent lubrication of the sealing rings, so that at the parts where the greatest friction occurs these rings are cleaned particularly effectively, and because of the removal of the particles of dirt and the more intensive cooling of the sealing lips as compared with known sealing rings they have a longer life.

The special advantages of a device according to the invention consist particularly in that through the simple association of the deflector element with a seal, preferably a stern tube seal, the entire device is made relatively simple and ensures effective cleaning of the sealing rings and accelerated removal of particles of dirt from the region of the sealing lips.

A device according to the invention provides the additional advantage that it can also be installed, without difficulty and without any considerable expense, in any existing seal of the kind described in the introduction to the specification.

We claim:
1. A device for improving circulation of a liquid lubricant comprising:
   a. a rotatable member;
   b. two axially spaced sealing rings mounted on said rotatable member, said rotatable member and said sealing rings forming a chamber in which the lubricant flows;
   c. a stationary deflector element having one end resting on the periphery of said rotatable member, said one end being positioned between and spaced apart from said sealing rings to provide a flow path for lubricant between said deflector element and said sealing rings; and
   d. means, surrounding said rotatable member, for carrying said sealing rings and for supporting said deflector element between said sealing rings.

2. A device according to claim 1, wherein the stationary deflector element is a planar element.

3. A device according to claim 1, wherein the stationary deflector element comprises a plurality of separate juxtaposed planar elements.

4. A device according to claim 1, wherein the stationary deflector element is arranged to form an angle with a radius of the rotatable member.

5. A device according to claim 1, wherein the stationary deflector element includes a pair of arms in the form of an inverted V, each of the arms being arranged to form an angle with a radius of the rotatable member.

6. A device according to claim 1, wherein the stationary deflector element is provided with channels for the passage of liquid lubricant.

7. A device according to claim 1, wherein the channels are formed as grooves at the end of the stationary deflector element, contacting the rotatable member.

8. A device according to claim 1, wherein the stationary deflector element is supported for adjustment in the radial direction in relation to the rotatable member.

9. A device according to claim 1, wherein adjustable spring means is provided for urging the stationary deflector element against the periphery of the rotatable member.

10. A device according to claim 1, wherein the stationary deflector element is of generally hexagonal cross-section.

11. A device according to claim 1, wherein the stationary deflector element has a cross-section generally that of a parallelogram.

12. A device according to claim 1, wherein the stationary deflector element is of generally circular cross-section.

13. A device according to claim 1, wherein the statioary deflector element comprises at least two partial elements of triangular cross-section which are spaced apart from one another.

14. A device according to claim 1, wherein the stationary deflector element comprises at least two partial elements of rectangular cross-section which are spaced apart from one another and which are disposed at an angle to one another.

15. A device according to claim 11, wherein the stationary deflector element tapers from bottom to top in cross-section.

16. A device according to claim 1, wherein the stationary deflector element comprises at least two partial elements of generally semicircular cross-section which are spaced apart from one another.

17. A device according to claim 1, wherein the stationary deflector element itself is provided with a passage for connection to a cooling device.

18. A device according to claim 1, wherein a plurality of stationary deflector elements are so supported as to be distributed around the periphery of the rotatable member between the sealing rings.

19. A device according to claim 1, wherein the rotatable member comprises a shaft.

20. A device according to claim 1, wherein the rotatable member comprises a shaft and a bush mounted on said shaft, said inner end of said deflector element resting on said bush.

21. A device according to claim 1, wherein the stationary deflector element is of generally oval shape in cross-section.

* * * * *